Norman B. Blake
INVENTOR.

Sept. 10, 1957     N. B. BLAKE     2,805,881
SAFETY BUMPER
Filed Jan. 28, 1955     2 Sheets-Sheet 2
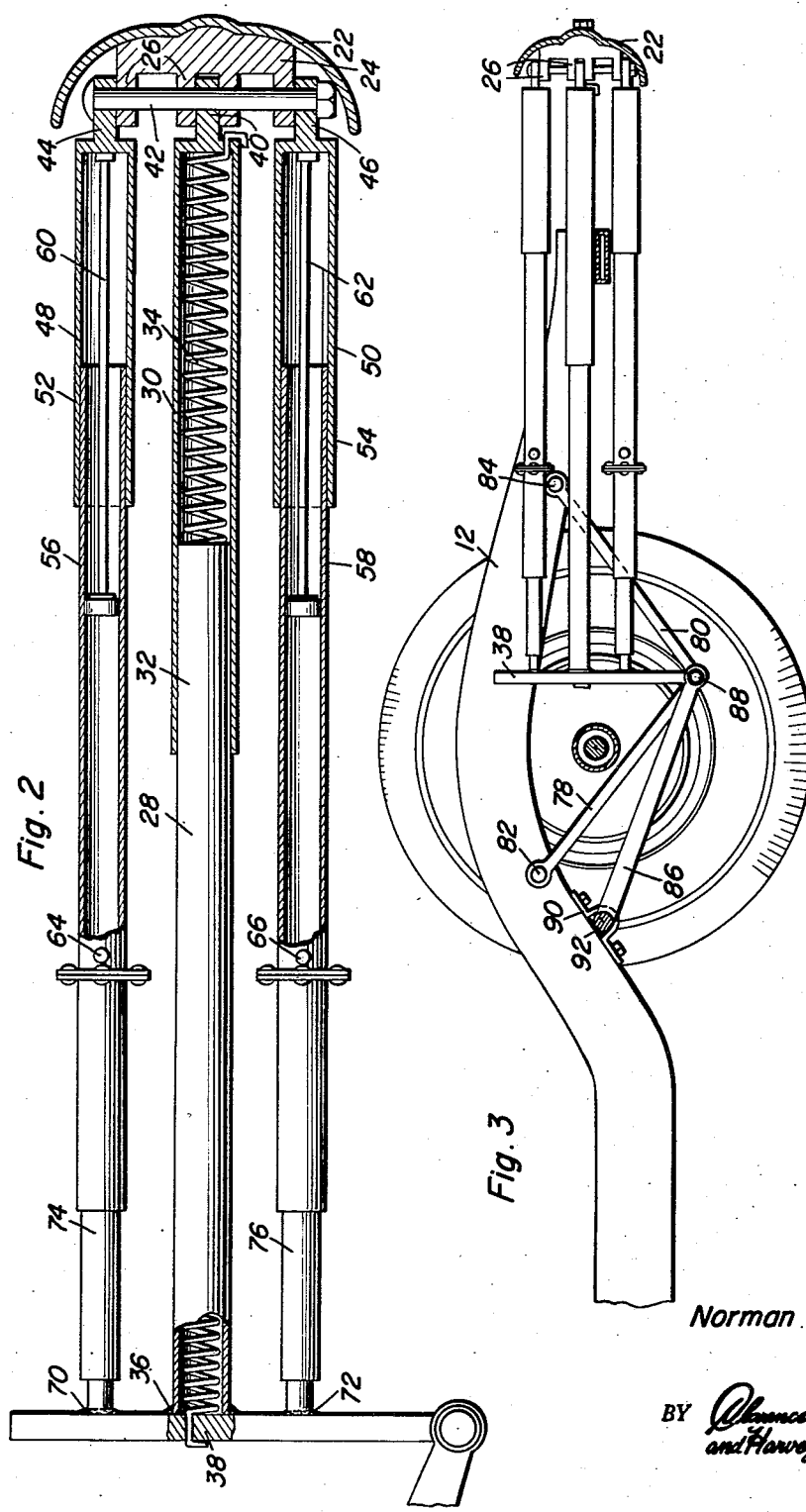
Norman B. Blake
INVENTOR.

United States Patent Office 2,805,881
Patented Sept. 10, 1957

2,805,881

SAFETY BUMPER

Norman B. Blake, Ronceverte, W. Va.

Application January 28, 1955, Serial No. 484,750

2 Claims. (Cl. 293—86)

This invention relates generally to motor vehicle construction and more particularly to improvements in the construction of bumpers for vehicles.

The primary object of the present invention resides in the provision of a novel arrangement of shock absorbing means for a bumper or the like to alleviate the usual disastrous results from collisions, which arrangement of parts may be adapted to both the front and rear of automotive vehicle.

A further important object of the invention resides in the provision of means for absorbing the shock of impact from collisions between vehicles or between the vehicle on which the bumper is installed and a solid object and wherein the shock of impact is generally transmitted throughout the vehicle so as to prevent the displacement of the vehicle to one side due to the impact.

The construction of this invention features the utilization of shock absorbers in conjunction with pneumatic dashpots and further utilizes the frame of the vehicle for transmitting the shock to the rear spring thereof. In addition, a telescoping tube having a mechanical spring therein is provided for also absorbing the shock and for returning the bumper to its initial position.

Still further objects and features of this invention reside in the provision of a safety bumper adapted to absorb and render substantially harmless the shock of impact due to a vehicle on which this bumper arrangement is installed, and which is strong and durable and relatively inexpensive to manufacture and install.

These, together with the various ancillary objects and features of the invention which will become apparent as the following description proceeds, are attained by the safety bumper, a preferred embodiment of which has been illustrated in the accompanying drawings, by way of example only, wherein:

Figure 2 is an enlarged longitudinal sectional view of the improved bumper assembly and illustrating the dashpots and the telescoping tube with the return spring mounted therein in detail; and Figure 3 is a sectional detailed view illustrating the manner in which the bumper assembly is mounted on the frame of a vehicle.

Figure 1:
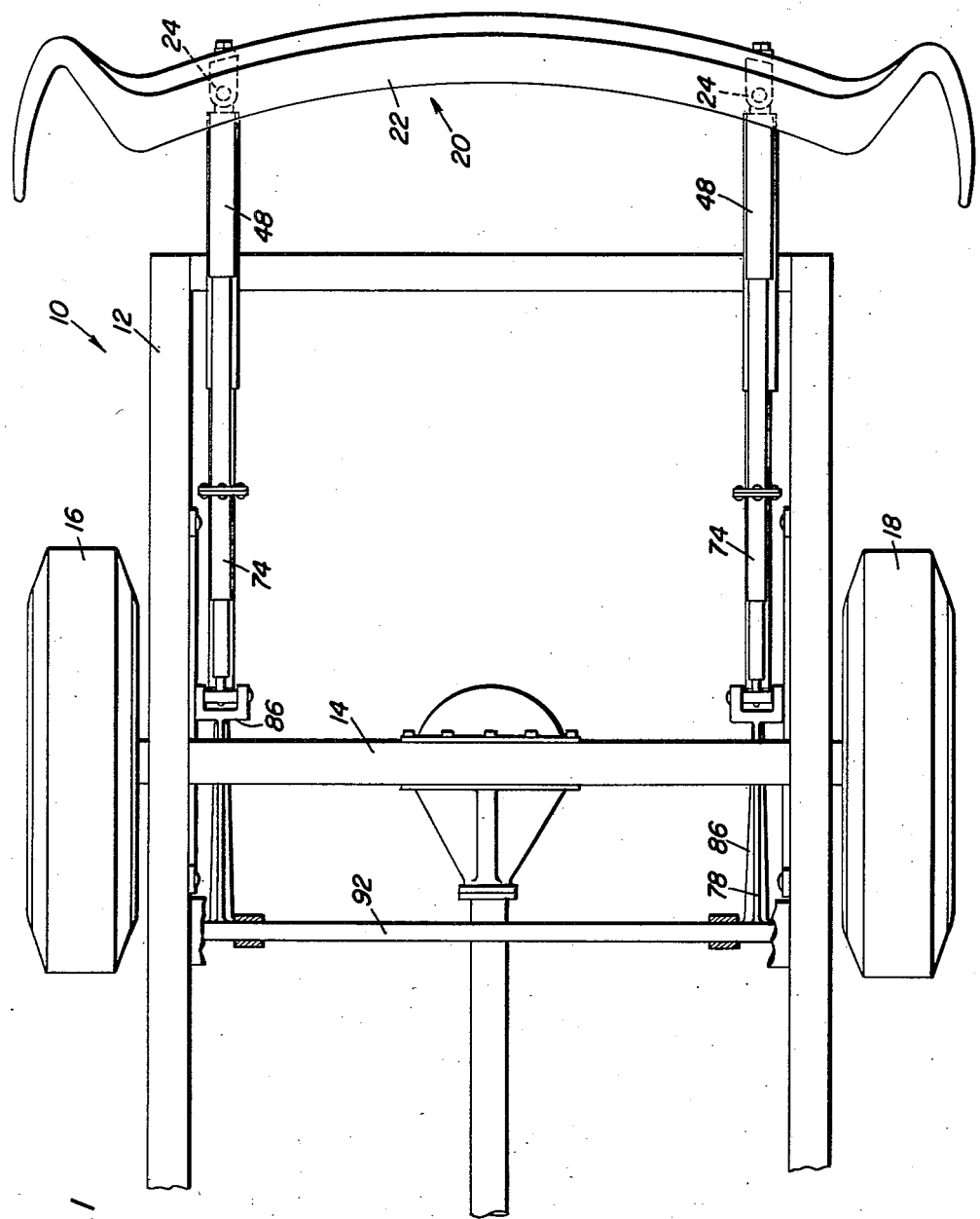
Figure 1 is a plan view of the safety bumper comprising the present invention shown installed on the chassis of a vehicle.

With continuing reference to the accompanying drawings wherein like reference numerals designate similar parts throughout the various views, reference numeral 10 generally designates the chassis of a vehicle having a frame 12 carrying a rear axle 14 and having wheels 16 and 18 at the rear end thereof. The bumper assembly comprising the present invention and generally designated by reference numeral 20 may be used on the front or rear of the vehicle, the bumper assembly being shown mounted on the rear of the vehicle in the drawings.

The bumper assembly 20 includes a bumper 22 of any convenient construction having bumper brackets 24 attached thereto on the opposite sides of the bumper 22.

The bumper brackets are provided with a plurality of apertured knuckles 26.

There is provided a telescoping tube 28 having an outer telescoping section 30 slidably receiving an intertelescoping section 32 both of which are hollow and adapted to receive a return spring 34 therein. The telescoping tube 28 has its inner tube 32 welded or otherwise attached as at 36 to a mounting plate 38 at one end and is provided with an eye 40 through which a pin 42 extends, the pin also extending through knuckles 36 to pivotally attach the telescoping tube 28 and particularly the outer section 30 to the bumper brackets 24 and hence to the bumper 22. A pair of dashpot assemblies are also provided with eyes as at 44 and 46 and are mounted on each side of the bumper and are held in place by the bumper pins 42. These dashpot assemblies are generally designated by reference numerals 48 and 50 for each side of the bumper and include carefully machined tubes 52 and 54 which receive cylinders 56 and 58 therein. Also attached to the tubes 48 and 50 are pistons 60 and 62 which are adapted to compress the air within the cylinders 56 and 58 during the impact stroke of the pistons 60 and 62 after a collision has occurred, the pistons 60 and 62 compress the air faster than the air can be exhausted through adjustable vent openings or valves 64 and 66. Attached to the ends of the cylinders 56 and 58 and also welded as at 70 and 72 to the mounting plate 38 are aircraft type shock absorbers 74 and 76.

It is to be recognized that an upper and lower dashpot assembly 48 and 50 as well as a telescoping tube 28 is provided on each side of the bumper at 22.

The mounting plate 38 has a pair of braces 78 and 80 pivotally attached thereto on each side of the vehicle, the braces being also pivotally attached as at 82 and 84 to the frame 12 of the vehicle. Further, a thrust bar 86 is pivotally attached at 88 to the mounting plate 38 and is held in place by means of a bracket as at 90 to the frame of the vehicle 12 in a pivotal manner, the thrust bar 86 being attached to a stress transfer bar 92 extending between each of the pair of thrust bars 86 on the opposite sides of the vehicle, the stress transfer bar 92 being provided for the purpose of transferring the shock of impact from one side of the vehicle to another so as to prevent the vehicle from being displaced sideways due to the impact.

The operation of this invention is believed to be obvious. When the vehicle collides with another vehicle, the spring 34 will be compressed and the air within the dashpots 48 and 50 will be compressed and heated and subsequently exhausted through the vents 64 and 66 thus absorbing considerable amounts of the energy of the impact. Further, the shock absorbers 74 and 76 will additionally absorb the shock of impact. The remaining shock of impact will be transferred to the frame 12 of the vehicle by means of the braces 78 and 80 as well as by the thrust bar 86 and the stress transfer bar 92. Due to the pivotal action of the pins 42 and of the stress transfer bar 92, even though the impact is not directed to the rear of the vehicle, the vehicle will not be moved sideways to any considerable extent due to the equalization of the shock as applied against the vehicle due to the action of this safety bumper. After collision, the spring 34 will return the bumper to its initial position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A safety device for an automotive vehicle comprising a bumper, a mounting plate, a spring pressed telescoping tube secured to said mounting plate, upper and lower pneumatic dashpot assemblies, said upper dashpot assembly being positioned above said telescoping tube, said lower dashpot assembly being positioned below said telescoping tube, shock absorbers attached to said mounting plate, and shock absorbers being secured to said dashpot assemblies and said mounting plate, a pin extending through said dashpot assemblies and said telescoping tube pivotally attaching said bumper to said dashpot assemblies and said telescoping tube, brace means pivotally attached to said mounting plate, said brace means being adapted to be pivotally secured to the frame of a vehicle, and a thrust member pivotally attached to said mounting plate for attachment to the frame of a vehicle.

2. A safety device for an automotive vehicle comprising a bumper, a mounting plate, a spring pressed telescoping tube secured to said mounting plate, upper and lower pneumatic dashpot assemblies, said upper dashpot assembly being positioned above said telescoping tube, said lower dashpot assembly being positioned below said telescoping tube, shock absorbers attached to said mounting plate, and shock absorbers being secured to said dashpot assemblies and said mounting plate, a pin extending through said dashpot assemblies and said telescoping tube pivotally attaching said bumper to said dashpot assemblies and said telescoping tube, said telescoping tube having a spring therein for returning said bumper to an initial position, brace means pivotally attached to said mounting plate, said brace means being adapted to be pivotally secured to the frame of a vehicle, a thrust member pivotally attached to said mounting plate for attachment to the frame of a vehicle, and a stress transfer bar attached to said thrust member normal thereto.

References Cited in the file of this patent
UNITED STATES PATENTS

| | | |
|---|---|---|
| 1,925,461 | Ridge | Sept. 5, 1933 |
| 2,202,050 | Gibbons | May 28, 1940 |
| 2,628,118 | Gunnels | Feb. 10, 1953 |